US006910604B2

United States Patent
Gugliotti et al.

(10) Patent No.: US 6,910,604 B2
(45) Date of Patent: Jun. 28, 2005

(54) KITCHEN SINK TOP-MOUNTED RIGID STEM-PORTABLE DISPENSER SOAP SYSTEM

(76) Inventors: Carmine Gugliotti, 19615 Trails End Ter., Jupiter, FL (US) 33458; Grace Gugliotti, 19615 Trails End Ter., Jupiter, FL (US) 33458

( * ) Notice: Subject to any disclaimer, the term of this patent is extended or adjusted under 35 U.S.C. 154(b) by 188 days.

(21) Appl. No.: 10/346,635

(22) Filed: Jan. 17, 2003

(65) Prior Publication Data

US 2003/0132248 A1 Jul. 17, 2003

Related U.S. Application Data

(60) Provisional application No. 60/350,307, filed on Jan. 17, 2002.

(51) Int. Cl.[7] ............................................. B67D 5/006
(52) U.S. Cl. .................................. 222/179.5; 222/383.1
(58) Field of Search ............................ 222/173, 179.5, 222/180, 184, 153, 321.9, 383.1

(56) References Cited

U.S. PATENT DOCUMENTS

| | | |
|---|---|---|
| 2,237,718 A * | 4/1941 | Thompson et al. ...... 222/179.5 |
| 3,571,821 A | 3/1971 | Kaiser |
| 4,470,523 A | 9/1984 | Spector |
| 4,625,896 A | 12/1986 | Rocchelli |
| 4,869,381 A * | 9/1989 | Agner ...................... 215/11.1 |
| 5,062,549 A | 11/1991 | Smith et al. |
| 5,114,048 A | 5/1992 | Minke |
| 5,148,948 A | 9/1992 | Granville et al. |
| 5,226,566 A | 7/1993 | Brandenburg |
| D344,232 S | 2/1994 | Granville et al. |
| 5,480,068 A | 1/1996 | Frazier et al. |
| D366,834 S | 2/1996 | Reid |
| 5,857,594 A | 1/1999 | Ozturk |
| 6,142,342 A | 11/2000 | Lewis |
| D438,041 S | 2/2001 | Huang |
| 6,349,851 B1 | 2/2002 | Lu |
| 6,390,340 B1 | 5/2002 | Lynch, Sr. |
| D470,401 S | 2/2003 | Genoa et al. |
| 6,520,470 B1 | 2/2003 | Chan |

* cited by examiner

*Primary Examiner*—David A. Scherbel
*Assistant Examiner*—Melvin A. Cartagena
(74) *Attorney, Agent, or Firm*—McHale & Slavin, P.A.

(57) ABSTRACT

The present invention provides a liquid soap dispensing apparatus having a counter-top mounting system that makes it possible to securely anchor the liquid dispensing device to a surface such as a counter-top and still allow easy removal for portability, so the dispenser can be transported and used in other areas. The apparatus also allows the soap reservoir to be easily refilled and utilizes readily available pump components.

9 Claims, 8 Drawing Sheets

KITCHEN SINK TOP-MOUNTED RIGID STEM-PORTABLE DISPENSER SOAP SYSTEM

REFERENCE TO RELATED APPLICATIONS

This application claims priority to provisional application Ser. No. 60/350,307, filed Jan. 17, 2002, the contents of which are herein incorporated by reference in their entirety.

FIELD OF THE INVENTION

This invention relates generally to a liquid dispensing apparatus and more particularly to a surface mounted liquid soap dispenser having a counter-top mounting system that makes it possible to securely anchor the liquid dispensing device to the counter-top and still allow portability.

BACKGROUND OF THE INVENTION

There are a variety of counter mounted fluid dispensers known in the prior art. Unfortunately, such mounted dispensers of liquid soap and other similar liquid products are often inconvenient to use and/or refill.

Counter-mounted dispensers have typically included a dispenser fixture located above the counter and a refillable soap reservoir located under the cabinet into which dip tubes are inserted. The dip tubes have typically included one or two check valves and a piston type pump. The fixture includes an actuation button that is depressed by the user when a quantity of soap is desired. When the actuation button is depressed, the pump is operated and soap is drawn from the reservoir, pushed through the delivery spout and into the user's hand.

Because of the location of the reservoir such as behind the sink these dispensers are very difficult to refill. The user is typically required to climb under the counter to remove the reservoir from the pump mechanisms that generally remain attached to the counter. The filled reservoir must then be returned to its position under the cabinet without spilling the liquid soap or causing it to overflow by reinserting the mechanism into an overfilled pump reservoir. These pump and valve arrangements are typically permanent installations and over a period of time the valves and/or pumps often fail or become clogged such that no soap can be dispensed. The owner is left with an unusable device and/or a hole in the counter-top that requires covering.

Wall-mounted liquid soap dispensers require double sided adhesive sheets to be applied to a wall surface. One side of the adhesive sheet is applied to the wall and the soap dispenser is adhered to the second side. Once a wall mounted dispenser is emptied it must be removed from the wall before it can be refilled or replaced. Often adhesive is left on the surface or the paint is removed with the adhesive sheet leaving the owner with a scarred or unsightly wall surface.

Counter-top liquid soap dispensers often have a problem with placement. The liquid soap dispenser must be placed on an already crowded counter adjacent the sink. In the past, these dispensers had no anchoring and were often tipped over or knocked into the sink. Counter-top dispensers are especially likely to be tipped over when they are low on liquid and are top heavy.

Accordingly, what is lacking in the art is a soap dispenser having a counter-top mounting system that makes it possible to securely anchor the liquid dispensing device to the counter-top and still allow portability, so the dispenser can be transported and used in other areas. The design should also allow the reservoir to be easily refilled and utilize readily available pump components.

DESCRIPTION OF THE PRIOR ART

A number of prior art devices exist for dispensing liquid soap, lotion or other viscous liquids.

U.S. Pat. No. 4,470,523 to Spector discloses a wall-mounted liquid soap dispenser whose container is formed of flexible plastic material and is provided with a flat rear wall and an externally threaded nipple projecting from the front wall adjacent the base. The nipple has a cap screwed thereon which incorporates a pivoted spigot that when folded in seals the nipple and when folded out creates an outlet from which soap is discharged when the front wall is depressed. In installing the assembly on a wall, a base sheet is adhered to a selected site on the wall after which a foot member is adhered to a central zone of the base sheet and the soap container is adhered to the foot member. The foot member acts as a load distributor for the soap dispenser to prevent it from dislodging from the wall. To remove the dispenser the base sheet must be peeled from the wall.

U.S. Pat. No. 6,390,340 to Lynch, Sr. discloses a counter-top liquid soap dispenser that includes a decorative housing with a soap reservoir and a pressurized gas reservoir disposed inside of the housing. A dispensing valve is provided between the pressurized gas reservoir and the soap reservoir for selectively allowing the pressurized gas to force the liquid soap through a flexible tube that extends outwardly from the housing. The housing is rested on a counter surface adjacent to the sink and the dispensing tube is extended along the faucet spout such that the distal end of the tube is positioned adjacent to the mouth of the faucet spout. The tube is coupled to the faucet spout by adhesive or fastening bands. However, there is no disclosure or a suggestion of securing a holding stem to the sink and using the holding stem to prevent the soap dispenser from sliding into the sink.

U.S. Pat. No. 5,226,566, to Brandenburg discloses a counter-mounted liquid soap dispensing apparatus which includes a permanently mounted actuator rod and dispenser spout adapted to be used with a disposable soap reservoir and piston pump module. The main objectives of the device are to keep the actuator rod and soap separated as well as providing a disposable soap cartridge that contains its own disposable pump. To complete these objectives the actuator rod and the dispenser spout are permanently mounted in the counter-top. A disposable soap reservoir and pump attach to the dispenser spout from underneath of the counter. When the user depresses the actuator button, the rod engages a pump piston in the refill cartridge to cause liquid soap to be pumped through a delivery tube. The delivery tube extends completely through the delivery spout of the fixture so that soap does not come into contact with the delivery spout.

U.S. Pat. No. 6,142,342 to Lewis discloses an improved counter-mounted liquid soap dispensing apparatus which includes a permanently mounted actuator rod and dispenser spout adapted to be used with a disposable soap reservoir. The patent is aimed at improving the Brandenburg apparatus by utilizing readily available viscous fluid pumps in place of the specially designed pumps in Brandenburg. Like the Brandenburg device the Lewis device maintains the soap reservoir below the counter-top and therefore has all of the problems associated therewith.

U.S. Pat. No. 5,857,594 to Ozturk discloses a soap dispensing device which is attached to the end of a standard kitchen faucet. The device is activated by rotating the device in a first direction which cuts off the flow of water and dispenses liquid soap. When the device is returned to the original position the soap flow is stopped and the original flow of water is returned.

U.S. Pat. No. 5,114,048 to Minke discloses a faucet assembly having an integral dispenser for liquid products such as soap, lotion, and the like. In addition to the conventional mixer tap for supplying water, the faucet assembly includes a pair of upstanding pump assemblies. The pump assemblies are manually operable to pump liquid products from reservoirs to a dispenser block located within the faucet assembly adjacent to the spigot. Reservoirs for the liquids dispensed from the pump assemblies are maintained under the counter-top.

U.S. Pat. No. 4,625,896 to Rocchelli discloses a soap dispenser that attaches to the water tap. The apparatus is designed as a split ring that fits under the base of a water tap. The device allows a soap dispenser to be installed without drilling holes in the sink. This device also requires the soap reservoir to be installed under the counter-top.

U.S. Pat. No. 3,571,821 to Kaiser discloses a kitchen sink with a raised section which houses a variable number of accessories. A removable ornamental plate closes the open top.

U.S. Pat. No. D438,041 to Huang discloses a soap supplier design. The design requires the soap reservoir to be installed under the counter-top.

U.S. Pat. No. D366,834 to Reid discloses a dispenser spout design. This design also requires the soap reservoir to be installed under the counter-top.

In addition to the difficulties associated with refilling and monitoring the fluid levels within these prior art devices they also lack portability. Typically these devices are permanently mounted to the faucet, counter-top or to an adjoining wall. Nothing in the prior art teaches or suggests a soap dispensing system wherein there is a permanently attached stem which removably and securely engages a portable soap container. The prior art further fails to teach a decorative pump head that is removable and replaceable to match various color schemes and the like.

SUMMARY OF THE INVENTION

In view of the foregoing disadvantages inherent in the known types of liquid soap dispensers in the prior art, the present invention provides a portable yet secured liquid soap dispensing system.

The general purpose of the present invention is to provide a counter-top soap dispenser system that utilizes a reservoir with a bottom surface constructed and arranged to cooperate with a holding stem rigidly secured to a surface, thereby preventing the reservoir from sliding or being inadvertently pulled into the sink. Because the reservoir is not permanently attached to the counter it can be easily refilled and/or moved and used in other locations that may or may not have the cooperating holding stem.

The principles and objectives of the present invention include, but are not limited to providing a method and apparatus for securing a liquid soap dispenser to a sink or counter-top.

Accordingly, a primary objective of the instant invention is to teach a novel apparatus and method for securing a liquid soap dispenser to a surface.

Another objective of the instant invention is to teach a liquid soap reservoir having a unique bottom surface capable of use with or without the holding stem.

Yet another objective of the instant invention is to teach an easily refillable liquid dispenser system.

Still yet another objective of the instant invention is to teach a tamper resistant liquid dispenser system.

Some of these objects are achieved by a reservoir assembly having a generally flat bottom surface with a centrally located cavity for cooperating with a holding stem that is secured to the sink or counter-top.

Other objectives and advantages of this invention will become apparent from the following description taken in conjunction with the accompanying drawings wherein set forth, by way of illustration and example, certain embodiments of this invention.

DETAILED DESCRIPTION OF THE PREFERRED EMBODIMENT

With reference now to the drawings, and in particular to FIG. 1 through 9, the liquid soap dispensing system embodying the principles and concepts of the present invention will be described.

Figure 1:
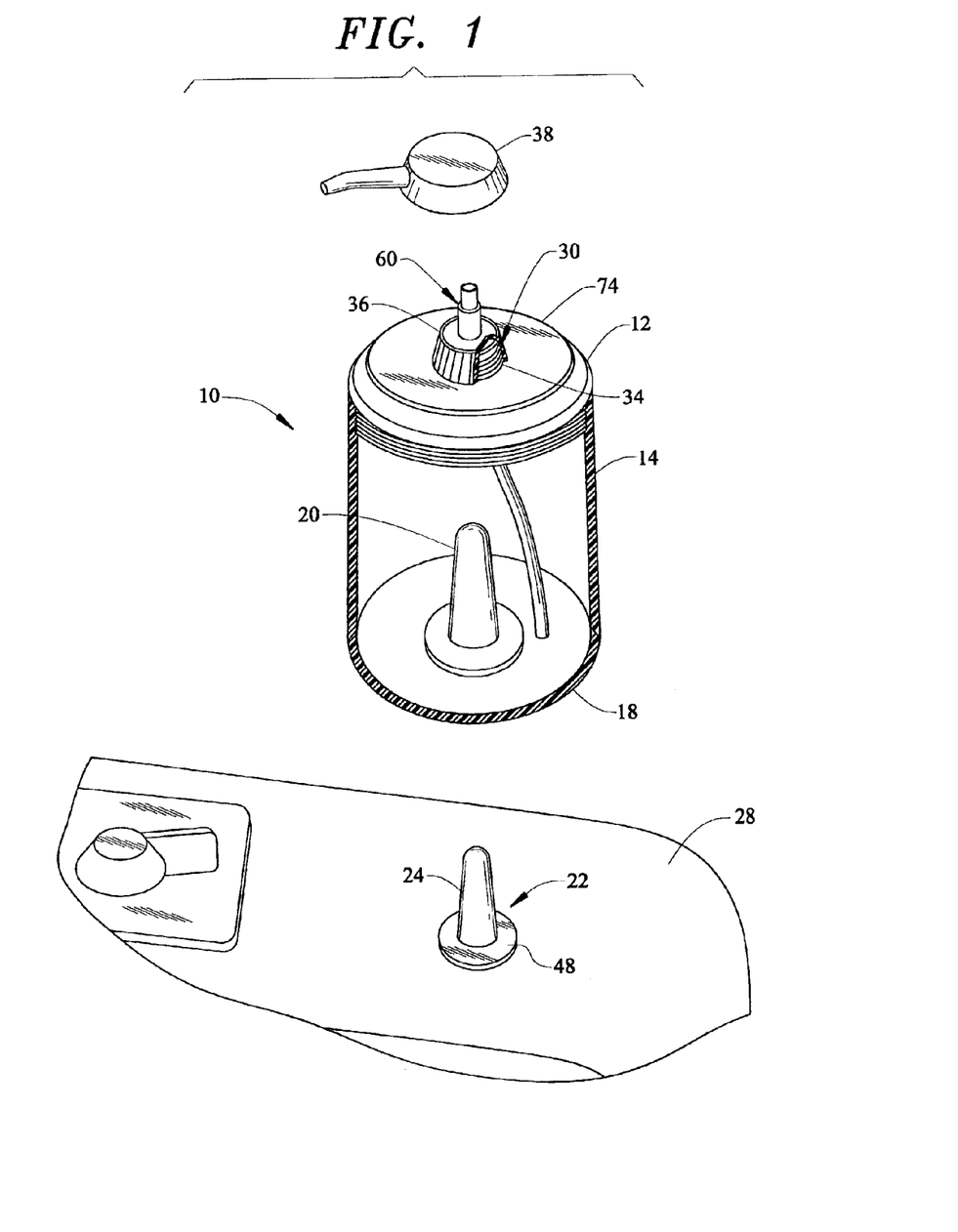
FIG. 1 is an isometric partially exploded view of one embodiment of the instant invention with a portion thereof being broken away illustrating the cooperating container and holding stem utilized to removably secure the invention to a surface.
Figure 2:
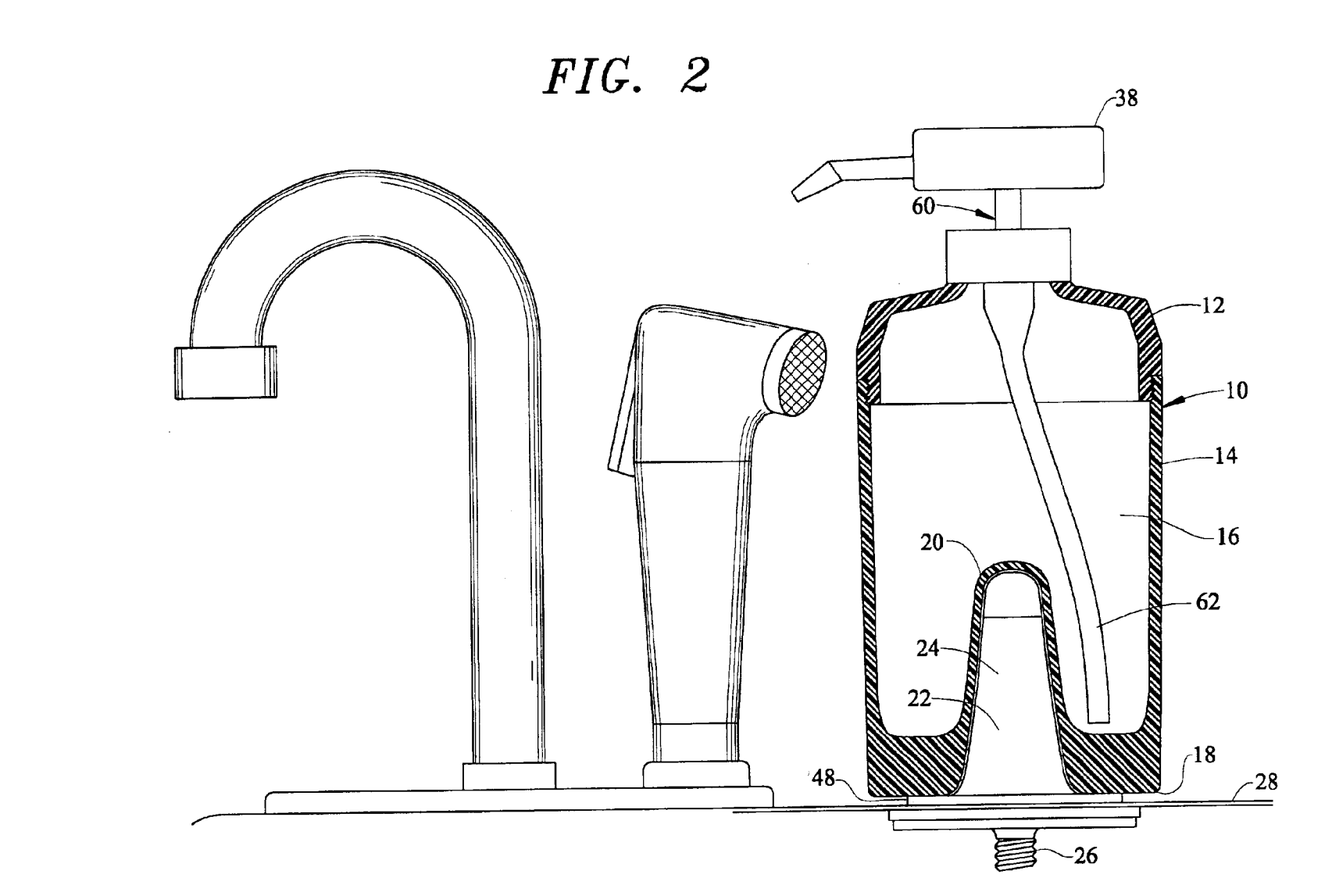
FIG. 2 is a side view of one embodiment of the instant invention with a portion of the container being broken away illustrating the cooperative engagement between the cavity in the lower surface of the container and the holding stem.

As best illustrated in FIGS. 1 and 2, the liquid soap system generally comprises a unique container 10 with a soap reservoir 16, a pump mechanism 60, and a holding stem 22. The pump mechanism 60 is in fluid communication with the soap reservoir 16 and has a actuator with a pump head 38 extending from the container 10. The holding stem 22 typically attaches to a surface 28 such as sink, counter-top, bathtub or the like and cooperates with the bottom surface of the container. In operation the container is slid downward over the holding stem to substantially prevent the container from tipping over or sliding across the counter-top.

In closer detail, the liquid soap system comprises a means for containing a supply of liquid illustrated herein as a container 10 preferably having a separable upper portion 12 and lower portion 14 with the upper portion 12 of the container 10 removably and sealably attached to the lower portion 14. Alternatively, the container 10 can be constructed as a one piece tamper resistant construction (FIG. 5) and may be disposable when the liquid is consumed. The interior chamber of the container 10 is utilized as a reservoir 16 for holding a supply of liquid illustrated herein as liquid soap. The instant invention could also be utilized to dispense other viscous liquids, e.g. lotion, hand cleaning cream, hand sanitizing cream and the like.

The top portion 12 of the container 10 assembly further comprises a pump mounting structure 30, fixedly connected to the container 10 to which the pump device 32 is attached. The pump mounting structure 30 is preferably constructed with an outer threaded portion 34. In this case the pump device 32 may have a cap 36 including inner threads to engage the outer threads 34 on the mounting structure 30. An optional identification disc 74 slides over the pump mounting structure 30 and is held firmly in place by the cap 36. The identification disc 74 provides a surface for labels, warnings or product identification. The identification disc 74 may also be formed in various shapes to allow the liquid within the reservoir to be visually identified by the shape of the disk. This feature is especially useful when more than one container 10 is secured to the same surface. Shapes for the identification disk may include but should not be limited to round, square, star, heart, daisy, egg, polygon and the like. The pump device also includes a removable and replaceable pump head 38. The pump head 38 is constructed and arranged for cooperative engagement with the pump device 32. In this manner the pump head 38 can be removed and replaced with different pump heads for decorative/product-identification purposes or should a pump head become clogged or damaged. Like the identification disk 74 the pump head 38 may be formed in various shapes and/or colors that would allow visual identification of the liquid within the container.

The lower portion of the container 14 has a lower surface 18 configured with a centrally located cavity 20 for cooperation with an anchoring means illustrated herein as a holding stem assembly 22. The holding stem assembly 22 is constructed and arranged with a proximal end 24 for cooperation with the cavity 20 and a distal end 26 for cooperation with at least one surface 28 having a flange 48 disposed therebetween.

Figure 3:
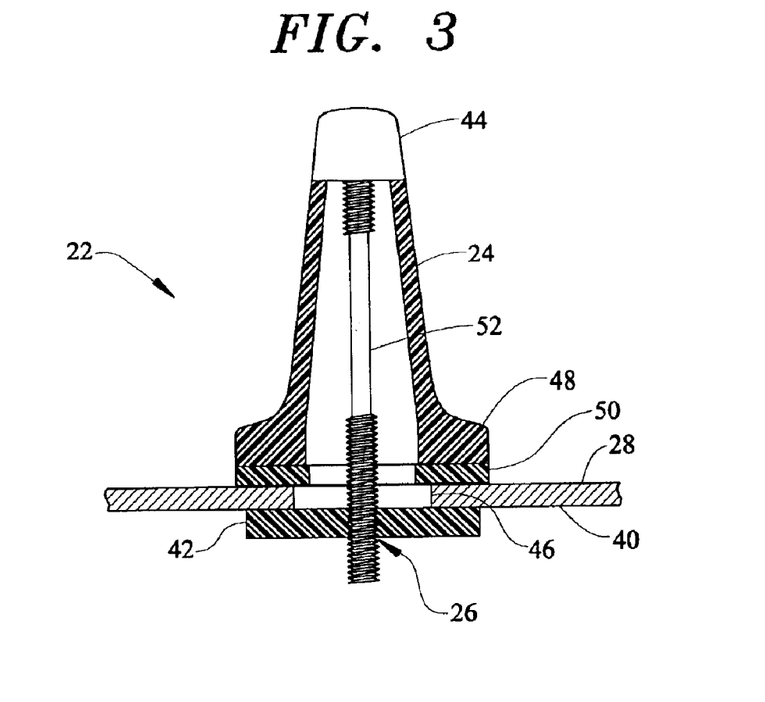
FIG. 3 is a side view of one holding stem embodiment with a portion thereof being broken away illustrating a holding stem attachment means wherein the locator stem utilizes a stud member and a second surface engagement means to attach the locator stem to a surface.
Figure 4:
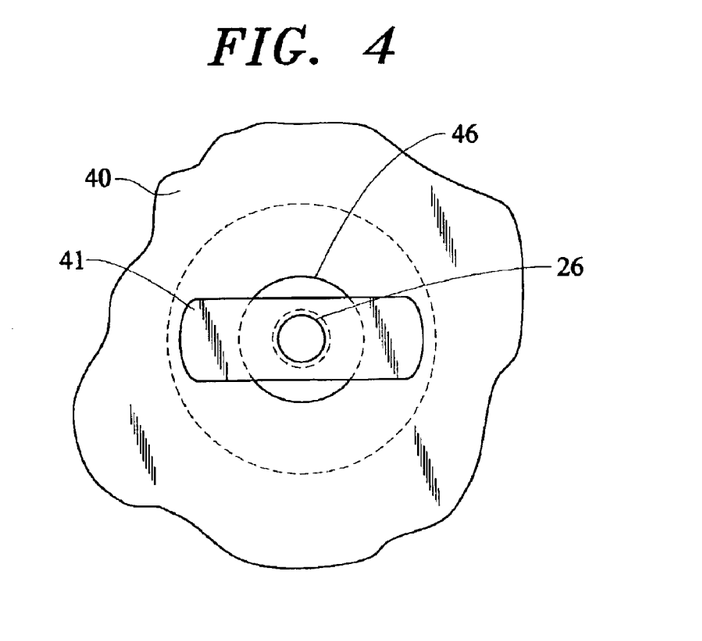
FIG. 4 is a bottom view of the attachment means shown in FIG. 2 illustrating a backing plate for engaging the second surface.

Referring to FIGS. 3 and 4 a preferred albeit non-limiting holding stem assembly 22 construction is shown. The holding stem assembly 22 utilizes a central stud member 52 secured to a cap member 44 at the proximal end 24 of the holding stem 22 extending downwardly through the annular stem, the first surface 28 and the second surface 40. The central stud member 52 threadedly connects to a second surface engaging means at the proximal end 26 of the holding stem 22 illustrated herein as sub-plate 42. The sub-plate 42 is constructed and arranged generally as a rectangle so as to allow insertion downwardly through the aperture 46. The assembly is secured by pulling upwardly and turning the cap 44 until the flange 48 and sub-plate 42 provide sufficient frictional engagement against both the first 28 and second surfaces 40. The stem assembly 22 may also include a watertight sealing means shown as, but not limited to, a resilient sealing member 50. The resilient sealing member 50 creates a watertight seal between the flange 48 and the first surface 28. Other suitable methods of creating a watertight seal that are well known in the art may be used in place of the resilient sealing member 50.

Figure 5:
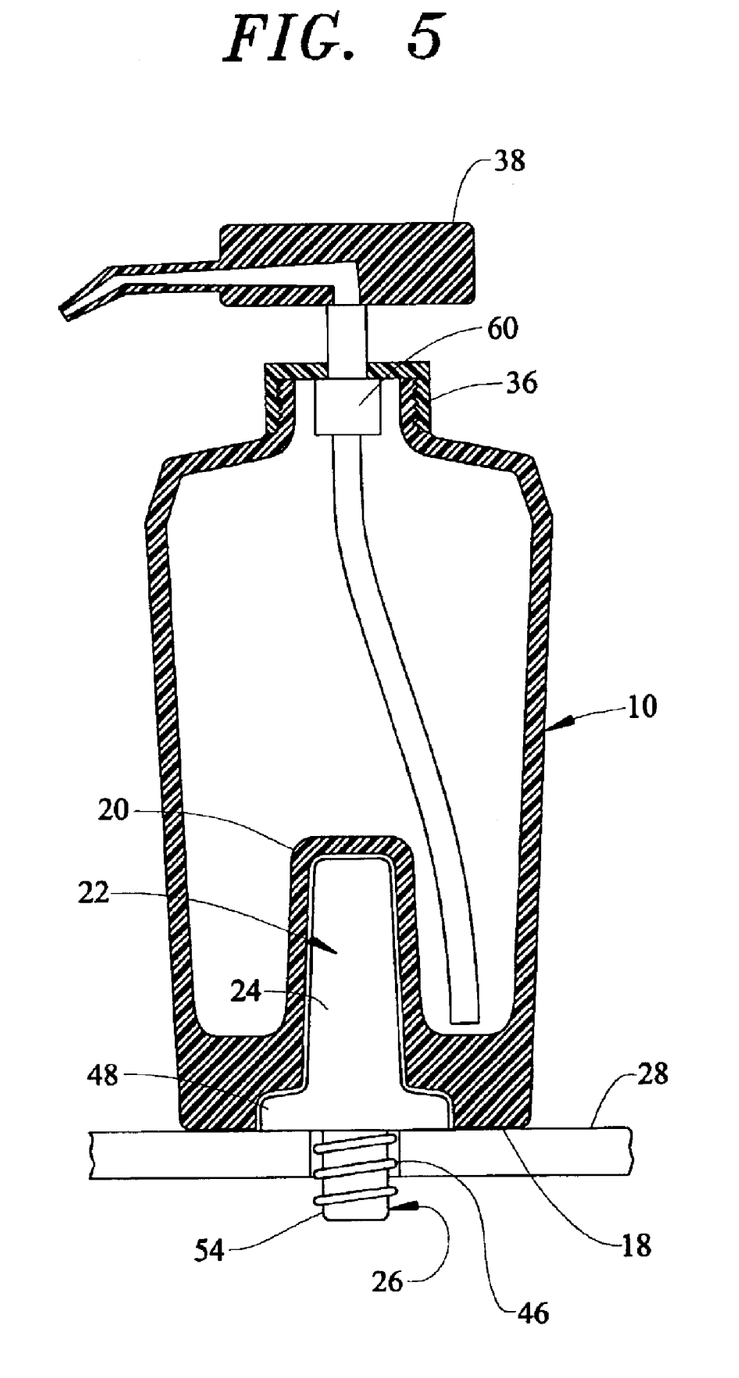
FIG. 5 is a side view of an alternative embodiment of the instant invention illustrating an alternative holding stem attachment means wherein the locator stem utilizes a threaded stub to secure the locator stem to a surface, also illustrated is a one piece container assembly.

Referring to FIG. 5 an alternative embodiment of the holding stem 22 is shown. In this embodiment the holding stem 22 utilizes a threaded stub 54 at the distal end 26 of the holding stem 22 to secure the holding stem 22 to a surface 28. To attach the holding stem to a surface the stem 22 is merely threaded into a sized aperture until the flange 48 tightens against the desired surface 28. Also illustrated is a one piece container assembly 10. The one piece container assembly may be disposable after the contents are used and replaced with a new container.

Figure 6:
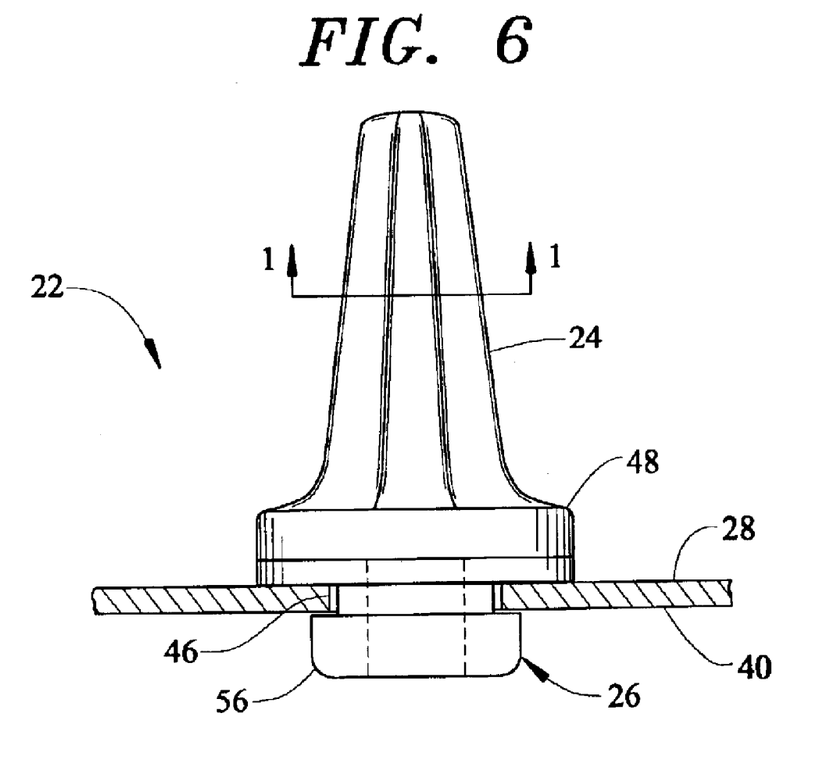
FIG. 6 is a side view of an alternative holding stem embodiment illustrating a geometrically shaped stem (hex) and a rubber grommet attachment means.
Figure 7:
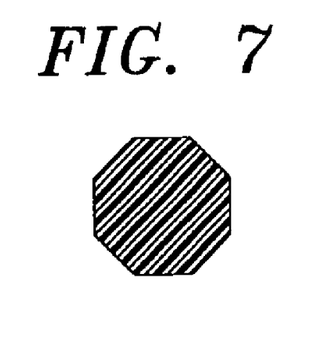
FIG. 7 is a cross-sectional view along line 1—1 of the holding stem of FIG. 6 illustrating a geometric shape (hex) utilized to directionally orient the dispenser.

Referring to FIGS. 6 and 7 an alternative holding stem 22 embodiment is illustrated wherein the proximal end 24 of the holding stem 22 is constructed with a polygon shaped periphery. By utilizing elliptical or other polygon shaped peripheries or combinations thereof on the proximal end 24 of the holding stem 22 the container 10 can be directionally oriented and/or indexed. Suitable geometric shapes may include but should not be limited to square, triangle, hexagon, octagon, ellipse, polygon, D-shaped or combinations thereof. The attachment means on the distal end 26 is illustrated as a rubber grommet 56. Holding stems 22 utilizing the rubber grommet 56 may be secured to a surface 28 by inserting the grommet 56 through a suitably sized aperture. It should be noted that when holding stems utilizing the shaped peripheries are used the cavity in the container should have a conjugate shape to that of the holding stem to permit cooperating engagement.

Figure 8:
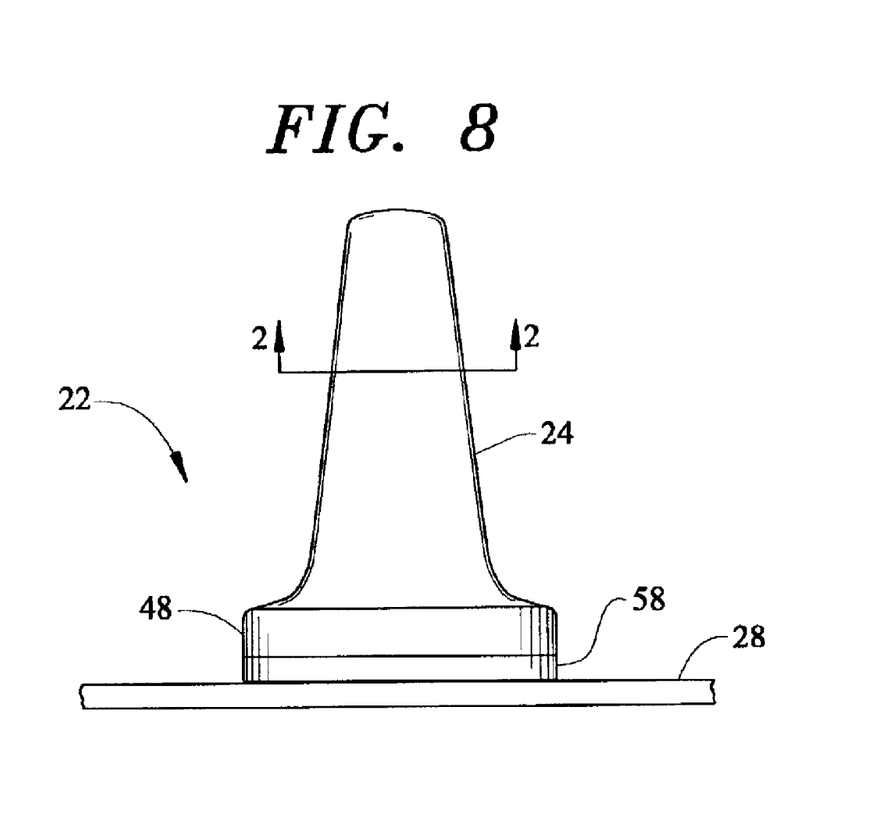
FIG. 8 is a side view of an alternative holding stem embodiment illustrating a geometrically shaped stem (round) and an adhesive pad attachment means.
Figure 9:
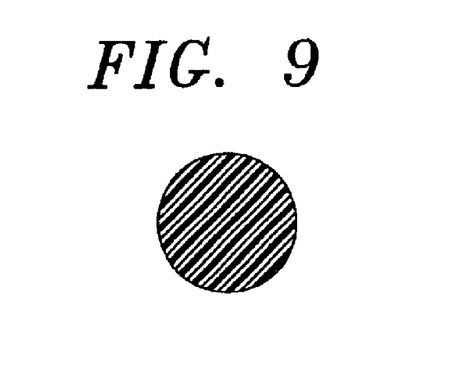
FIG. 9 is a cross-sectional view along line 2—2 of the holding stem of FIG. 8 illustrating a geometric shape (round) utilized to allow the dispenser to be infinitely oriented.

Referring to FIGS. 8 and 9 an alternative holding stem embodiment is illustrated wherein the proximal end 24 of the holding stem 22 is constructed with a round perimeter. By utilizing the round shaped perimeter on the proximal end 24 of the holding stem 22 the container 10 can be infinitely rotated and oriented. The holding stem 22 illustrated utilizes an adhesive pad 58 to secure the proximal end 24 of the stem 22 to a surface 28. Adhesive pads such as the one utilized herein are well known in the art. Use of the adhesive pad 58 eliminates the need for an aperture 46 to mount a holding stem 22.

As a further modification the stem 22 may be magnetized or contain at least one magnet within the stem. In this manner a holding stem 22 can be mounted to magnetic surfaces such as cast iron sinks and bath-tubs without the need for an aperture 46. A second magnet may also be placed with the container cavity 20 or adjacent to the bottom surface 18 to cooperate with the magnetic stem.

Figure 10:
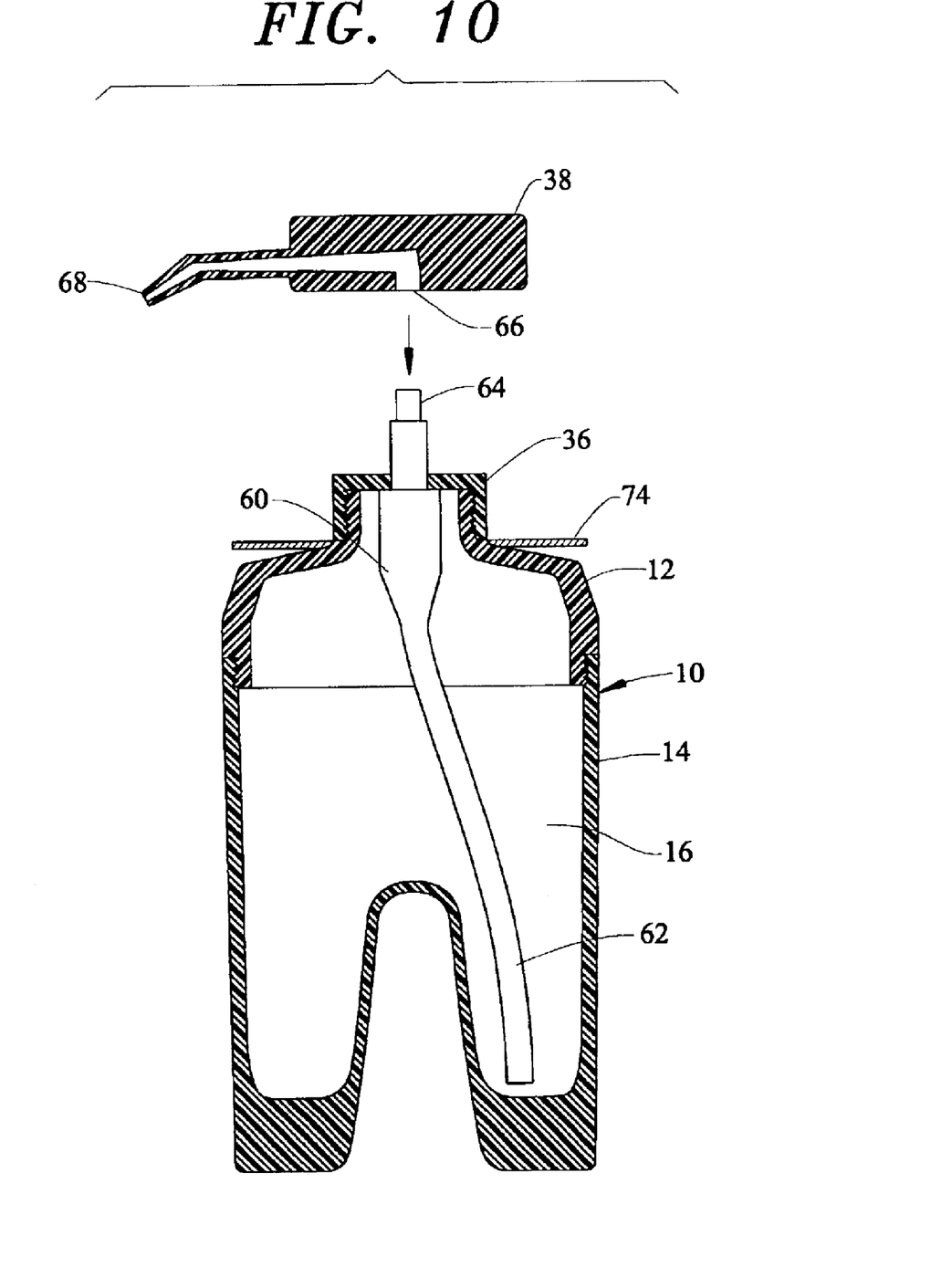
FIG. 10 is a cross-sectional side view of the container and pump head illustrating the centrally located cavity in the bottom surface of the container as well as the optional removable and replaceable pump head and the optional identification disc.

Referring to FIG. 10 a cross-sectional side view of the container 10 and pump head 38 illustrating the centrally located cavity 20 in the bottom surface 18 of the container 10 as well as the optional removable and replaceable pump head 38 and identification disc 74. Supported within the canister is the pump means 60, the pump means is generally supported by the cap 36 which has a centrally located opening therein. Extending downward from the pump is the suction tube 62, extending upwardly from the pump is the actuator tube 64. The pump head 38 is constructed with an aperture 66 in its lower surface to cooperate with the actuator tube 64. The proximal end of the pump tube thus sealably engages the pump head aperture 66. Operation of the pump means 60 causes viscous liquid contained in the reservoir 16 to be drawn into the suction tube 62. The viscous fluid is then forced upward through the actuator tube 64 and the pump head 38 exiting through the dispenser tube 68. This arrangement permits the pump heads 38 to be removed from the pump 60 and replaced with other decorative/identification pump heads.

Figure 11:
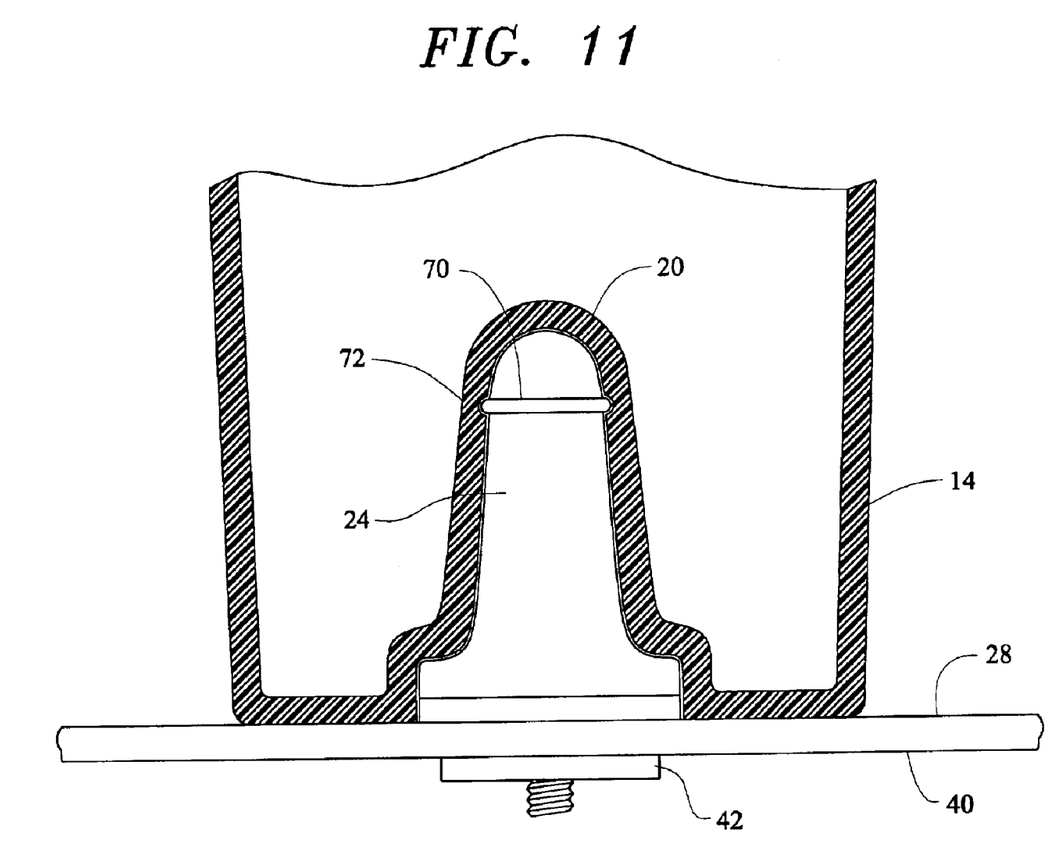
FIG. 11 is a partial side view of the instant invention illustrating an alternative embodiment of the holding stem with a portion of the container being broken away for clarity.

Referring to FIG. 11 a partial side view with a portion of the container being broken away is shown. In this non-limiting embodiment the holding stem 22 is constructed with a locking means illustrated herein as a protuberance 70 on the proximal end 24 of the locking stem 22. The protuberance 70 is constructed and arranged to cooperate with an indentation 72 in the centrally located cavity 20 of the container 10. The cooperation of the protuberance 70 and the indentation 72 provides secure retention of the container 10. It is also contemplated and understood that other suitable means of securing the container to the holding pin well known in the art could be substituted for the means illustrated herein.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

We claim:

1. A detachably anchored liquid dispensing system, comprising:
    a container means for containing a supply of liquid, said container having an upper portion and a lower portion, a cavity in said lower portion constructed and arranged for cooperative engagement with an anchoring means;
    a pump means, said pump means having an inlet adapted to communicate with said supply of liquid and an outlet port for dispensing said liquid;
    said anchoring means for detachably holding said container means, said anchoring means having a proximal end and a distal end, said proximal end constructed and arranged for cooperative engagement with said lower portion of said container means and said distal end constructed and arranged for securement to a surface;
    wherein said pump means is actuated to dispense said liquid and said anchoring means prevents said dispensing system from tipping over or sliding on said surface;
    said proximal end of said anchoring means is constructed as an upwardly standing stem, said stem having a polygon shaped periphery;
    wherein said polygon shaped periphery on said proximal end of said stem cooperates with a conjugate shaped cavity in said lower surface of said container and prevents undesired rotation of said container.

2. The liquid dispensing system of claim 1 wherein said upper portion and said lower portion of said container are separable portions so that said upper portion of said container is detachable from said lower portion of said container to permit refilling of said liquid into said container.

3. The liquid dispensing system of claim 1 wherein said proximal end of said anchoring means is constructed as an upwardly standing stem, said stem having a round shaped circumference;
    wherein said round shaped circumference on said proximal end of said stem cooperates with said cavity in said lower surface of said container.

4. The liquid dispensing system of claim 1 wherein said proximal end of said anchoring means is constructed as an upwardly standing stem, said stem having a tapered outer surface;
    wherein said tapered surface on said proximal end of said stem cooperates with said cavity in said lower surface of said container.

5. The liquid dispensing system of claim 1 wherein said distal end of said anchoring means includes a resilient snap in grommet for securing said anchoring means to a surface, said resilient snap in grommet configured and arranged for insertion through an aperture;
    wherein said resilient snap in grommet is collapsible to pass through said aperture and expands after passing through said aperture to secure said anchoring means to said surface.

6. The liquid dispensing system of claim 1 wherein said pump means includes a removable and replaceable pump head constructed and arranged to cooperate with said pump means, said pump head having an inlet for receiving fluid from said container means and a fluid outlet for dispensing of said fluid.

7. A detachably anchored liquid dispensing system, comprising:
    a container means for containing a supply of liquid, said container having an upper portion and a lower portion, a cavity in said lower portion constructed and arranged for cooperative engagement with an anchoring means;
    a pump means, said pump means having an inlet adapted to communicate with said supply of liquid and an outlet port for dispensing said liquid;
    said anchoring means for detachably holding said container means, said anchoring means having a proximal end and a distal end, said proximal end constructed and arranged for cooperative engagement with said lower portion of said container means and said distal end constructed and arranged for securement to a surface;
    said pump means is actuated to dispense said liquid and said anchoring means prevents said dispensing system from tipping over or sliding on said surface;

said proximal end of said anchoring means is constructed as an upwardly standing stem, said stem having a means for interlocking engagement with said lower portion of said container means;

said means for interlocking engagement provides secure retention of said container;

said means for interlocking engagement between said stem and said container comprises, said stem having at least one protuberance for cooperative interlocking engagement with said lower portion of said container means and said cavity in said lower portion of said container having at least one indentation for cooperating with said protuberance on said stem;

wherein said at least one protuberance on said proximal end of said stem cooperates with said indentation in said conjugate shaped cavity in said lower surface of said container for more secure retention of said container.

8. The liquid dispensing system of claim 1 wherein said distal end of said anchoring means includes a resilient seal, said resilient seal constructed and arranged to cooperate with said surface to form a watertight seal between said surface and said distal end of said anchoring means.

9. A detachably anchored liquid dispensing system, comprising:

a container means for containing a supply of liquid, said container having an upper portion and a lower portion, a cavity in said lower portion constructed and arranged for cooperative engagement with an anchoring means;

a pump means, said pump means having an inlet adapted to communicate with said supply of liquid and an outlet port for dispensing said liquid;

said anchoring means for detachably holding said container means, said anchoring means having a proximal end and a distal end, said proximal end constructed and arranged for cooperative engagement with said lower portion of said container means and said distal end constructed and arranged for securement to a surface;

wherein said pump means is actuated to dispense said liquid and said anchoring means prevents said dispensing system from tipping over or sliding on said surface, said distal end of said anchoring means includes at least one magnet for magnetically engaging said surface;

wherein said at least one magnet secures said anchoring means to said surface.

* * * * *